(12) United States Patent
Mayse (10) Patent No.: US 11,858,125 B2
(45) Date of Patent: Jan. 2, 2024

(54) ACTUATOR AND GRIPPER HEAD HAVING AN ACTUATOR

(71) Applicant: Mid Atlantic Machinery, Harrisburg, PA (US)

(72) Inventor: Joshua C. Mayse, Bloomsburg, PA (US)

(73) Assignee: Mid Atlantic Machinery, Harrisburg, PA (US)

( * ) Notice: Subject to any disclaimer, the term of this patent is extended or adjusted under 35 U.S.C. 154(b) by 210 days.

(21) Appl. No.: 17/399,893

(22) Filed: Aug. 11, 2021

(65) Prior Publication Data

US 2022/0048206 A1 Feb. 17, 2022

Related U.S. Application Data

(63) Continuation-in-part of application No. 17/190,951, filed on Mar. 3, 2021.

(60) Provisional application No. 63/064,246, filed on Aug. 11, 2020.

(51) Int. Cl.
  *B25J 15/06* (2006.01)
  *B25J 9/14* (2006.01)
  *B25J 15/00* (2006.01)
  *B25J 9/12* (2006.01)

(52) U.S. Cl.
  CPC ........... *B25J 15/0641* (2013.01); *B25J 9/126* (2013.01); *B25J 9/146* (2013.01); *B25J 15/0066* (2013.01); *B25J 15/0658* (2013.01); *B25J 15/0023* (2013.01)

(58) Field of Classification Search
  CPC .......... B25J 15/0023; B25J 15/0061; B25J 15/0433; B25J 15/06; B25J 15/0616; B25J 15/0641; B25J 15/0658; B25J 9/126; B25J 9/146
  See application file for complete search history.

(56) References Cited

U.S. PATENT DOCUMENTS

| 2013/0025946 A1* | 1/2013 | Tanaka | B25J 15/0616 177/245 |
| 2016/0089780 A1* | 3/2016 | Marttinen | F16D 7/027 901/23 |
| 2021/0370526 A1* | 12/2021 | Fukushima | B25J 15/0625 |

* cited by examiner

*Primary Examiner* — Tyrone V Hall, Jr.
(74) *Attorney, Agent, or Firm* — Walter Ottesen, P.A.

(57) ABSTRACT

A gripper head assembly is for a robotic gripping system and includes an actuator. The actuator includes: an actuator body having an attachment region configured to attach the actuator body to the gripper head; a drive element having a mounting section for a tool; a drive having a connector configured to receive an input; the drive being configured to move the drive element upon receiving the input; the drive element defining a through passage; the through passage having a first port for receiving at least one of negative pressure and positive pressure; and, the through passage having an outlet at the mounting section configured to supply the tool with the at least one of negative and positive pressure.

21 Claims, 12 Drawing Sheets

ACTUATOR AND GRIPPER HEAD HAVING AN ACTUATOR

CROSS REFERENCE TO RELATED APPLICATIONS

This application claims priority of U.S. provisional patent application No. 63/064,246 and filed on Aug. 11, 2020, and is a continuation-in-part of U.S. patent application Ser. No. 17/190,951, filed Mar. 3, 2021, and the entire content of both applications is incorporated herein by reference.

TECHNICAL FIELD

The disclosure relates to robotic gripper heads and gripper head assemblies having an actuator.

BACKGROUND

The robotics landscape is rapidly changing with the introduction of collaborative robots. Robots are working beside humans and able to be deployed for a constantly growing number of tasks. With this comes the ability to use a single robot for many different tasks. Robots need to be rapidly redeployed and adapted to different workpieces or tasks. Different sizes, types, and shapes of material need to be transported via the robot. This requires many different robot process end effectors to be developed and maintained. Gripping can be a challenge for a robot being deployed to do many different tasks or handling many different workpieces. Development of grippers for new workpieces can be very costly and take an extended period of time to develop. Maintaining a large library of robot end effectors to handle different workpieces or jobs can be very costly.

Two robotic arms are often used at a processing station. The first arm places a workpiece into a processing station and a second arm is used to retrieve, reposition or remove the workpiece.

SUMMARY

It is an object of the disclosure to provide an actuator which can rotate a work tool and connect the work tool to a source of negative and/or positive pressure.

The aforementioned object can, for example, be achieved by a rotary actuator for a gripper head. The rotary actuator includes: an actuator body having an attachment region configured to attach the actuator body to the gripper head; a rotary shaft having a mounting section for a tool; a rotary drive having a connector configured to receive an input; the rotary drive being configured to rotate the rotary shaft upon receiving the input; the rotary shaft defining a through passage; the through passage having a first port for receiving at least one of negative pressure and positive pressure; and, the through passage having an outlet at the mounting section configured to supply the tool with the at least one of negative and positive pressure.

The aforementioned object can, for example, also be achieved by an actuator for a gripper head. The actuator includes: an actuator body having an attachment region configured to attach the actuator body to the gripper head; a drive element having a mounting section for a tool; a drive having a connector configured to receive an input; the drive being configured to move the drive element upon receiving the input; the drive element defining a through passage; the through passage having a first port for receiving at least one of negative pressure and positive pressure; and, the through passage having an outlet at the mounting section configured to supply the tool with the at least one of negative and positive pressure.

According to an embodiment, the actuator can also be a translational actuator.

According to an embodiment, the rotary actuator further includes a rotary hub configured to be mounted on the mounting section of the rotary shaft and rotate therewith; a tool plate configured to attach to the rotary hub and rotate therewith; and, the tool plate defining an internal channel configured to connect the outlet of the through passage to an input of a tool.

According to an embodiment, the tool plate defines a hub pocket; and, the rotary hub is at least partially accommodated in the hub pocket when the tool plate is attached to the rotary hub.

According to an embodiment, the connector of the rotary drive is a first connector. The rotary drive has a second connector configured to receive at least one of positive pressure and negative pressure. The rotary actuator rotates the rotary hub in a first direction in response to receiving the at least one of negative pressure and positive pressure at the first connector and in a second direction in response to receiving the at least one of positive and negative pressure at the second connector.

According to an embodiment, the rotary actuator further includes a vacuum tool plate; the tool being a suction cup; and, the vacuum tool plate having a connection point configured to hold the suction cup.

According to an embodiment, the vacuum tool plate defines an internal channel configured to connect the outlet of the through passage to the connection point.

According to an embodiment, the rotary drive is pneumatically driven or the rotary drive is electrically driven.

According to an embodiment, the rotary hub is configured to hold the tool plate and a second tool.

According to a further embodiment, the rotary actuator further includes a tool plate configured to attach to the rotary shaft and rotate therewith. The tool plate defines an internal channel configured to connect the outlet of the through passage to an input of a tool.

According to an embodiment, an actuator assembly includes a rotary actuator as described above and a translational actuator.

According to an embodiment, the actuator assembly also includes a plurality of rotary actuators each defining a rotational axis and a plurality of translational actuators each defining a plane of translation. Each of the rotary actuators and the translational actuators is controlled by independent input pressures.

According to an embodiment, each of the translational actuators and the rotary actuators can be actuated concurrently.

According to an embodiment, the rotary shaft defines an axis of rotation. The rotary drive is configured to rotate the rotary shaft so as to assume any rotational position along the axis of rotation.

It is a further object of the disclosure to provide a gripper head having such an actuator.

The aforementioned object can, for example, be achieved by a gripper head having a rotary tool attachment. The gripper head includes: an actuator having an attachment region for a tool configured to attach the actuator to the gripper head; the actuator having a rotary shaft with a mounting section for a tool; the actuator further having a rotary drive; the rotary drive having a connector configured to receive an input and being configured to rotate the rotary shaft upon receiving the input; the rotary shaft defining a through passage; the through passage having a first connection for receiving at least one of negative pressure and positive pressure; the through passage having an outlet at the mounting section configured to supply the tool with the at least one of negative and positive pressure; a gripper head body having a mounting area and a tool section defining an attachment area for a tool assembly; the mounting area being configured to attach said gripper head body to a mount of a robot; the gripper head body having a first port at the mounting area and a second port at the tool section; the gripper head body defining an internal channel mutually connecting the first port and the second port; the internal channel being configured to pass air between the first port at the mounting section and the second port at the tool section; and, the first connection of the rotary shaft being configured to connect to the second port of the gripper head for supplying the tool with the at least one of negative and positive pressure.

According to an embodiment, the gripper head of the disclosure further includes a connector connecting the second port of the gripper head to the first connection of the through passage.

According to an embodiment, the first tool is a vacuum tool plate including suction cups and the second tool is a pinch gripper.

According to an embodiment, the vacuum tool plate is configured to attach to the rotary hub. The vacuum tool plate includes a secondary tool attachment section for holding the pinch gripper.

According to an embodiment, a rotary actuator assembly of the disclosure includes: an actuator body having an attachment region configured to attach the actuator body to a gripper head; a rotary shaft having a mounting section; a rotary drive having a connector configured to receive an input; the rotary drive being configured to rotate the rotary shaft upon receiving the input; the rotary shaft defining a through passage; the rotary shaft having a first port for receiving at least one of negative pressure and positive pressure; a rotary hub configured to hold a first tool and a second tool; and, the through passage having an outlet at the mounting section configured to supply at least one of the first tool and the second tool with the at least one of negative and positive pressure.

With an actuator attached to the gripper head, the tool attached to the gripper head can, after placing the workpiece into the processing station, be repositioned to also retrieve, reposition or remove the workpiece from the processing station without requiring the entire robot to be moved for an adjustment for the removal, retrieval or repositioning of the workpiece. A gripper head equipped with an actuator according to the disclosure can reduce both the time required by an operator for programming a routine performed by the robot and also reduce the cycle time of the routine because only the state of the inputs must be changed instead of moving the entire robot to a different position for a large number of possible routines to be performed by the robot.

BRIEF DESCRIPTION OF THE DRAWINGS

The invention will now be described with reference to the drawings wherein.

DESCRIPTION OF THE PREFERRED EMBODIMENTS

Figure 1:
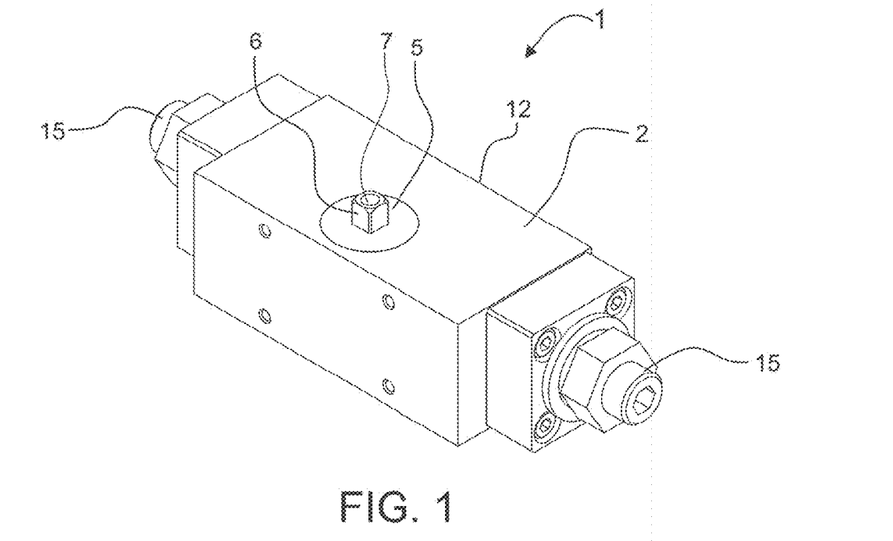
FIG. 1 shows an actuator according to the disclosure.

FIG. 1 shows an embodiment of a rotary actuator 1 according to the disclosure. The actuator 1 can also be a linear actuator. The actuator 1 has an actuator body 2. The actuator 1 includes a drive element configured to be connected to a tool. In a rotary actuator, the drive element is a rotary shaft 5 and the rotary actuator 1 is configured to rotate the rotary shaft 5. The actuator 1 can thus rotate the tool via the rotary shaft 5. In the embodiment of FIG. 1, an end 6 of a rotary shaft 5 protrudes from the actuator body 2 and the tool 40 or tool interface 45 can engage the protruding end of the rotary shaft 5 so as to operatively connect the tool to the actuator. The actuator 1 includes a drive 10 configured to rotate the rotary shaft 5. The actuator body 2 can include a casing 12 and the drive 10 is disposed in the casing 12.

Figure 2A:
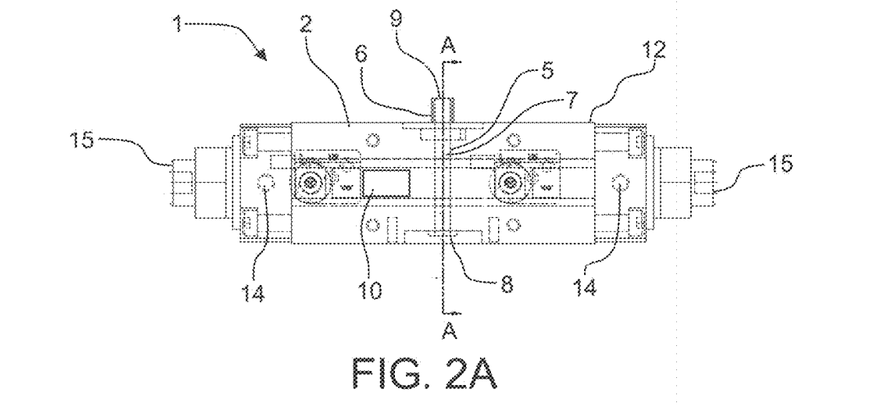
FIG. 2A is a front section view of the actuator of FIG. 1.

The actuator 1 is configured to be actuated via an input received at a connector 14 (FIG. 2A). In an exemplary embodiment, the actuator 1 has a connector 14 for an air hose. The connector 14 enables a connection to a positive and/or negative pressure generator via an air hose. As shown in FIG. 2A, the actuator 1 can include two connectors 14 for air hose connections. The drive of the actuator 1 can, for example, be actuated via positive or negative pressure supplied to the actuator 1 via the air hose connected to the connector 14. In an example, the drive 10 is a pneumatically driven rack and pinion system which rotates the rotary shaft 5 in response to an input being received at the connector 14. The drive 10 can also be actuated in an alternate manner, for example, electrically, whereby the connector 14 is configured to receive power and/or electrical signals for the actuator 1.

In the case of a rotary actuator 1, the drive 10 can cause the rotary shaft 5 to assume any rotational position. In the embodiment shown in FIG. 1, the actuator 1 includes two angle adjustors 15. The first angle adjustor 15 can set a starting angle and the second angle adjustor 15 can set an end angle so that the angle adjustors 15 set a range of rotation for the rotary shaft 5. In the case of a linear or translational actuator, the drive 10 can move the drive element between two end positions. The drive 10 can be configured to have the drive element assume any position between the two end positions.

FIG. 2A shows the actuator of FIG. 1 in a front section view. The drive 10 for rotating the rotary shaft 5 is arranged in the casing 12. The rotary shaft 5 defines a through passage 7. The through passage 7 has a first opening 8 configured to connect to a positive and/or negative pressure generator and a second opening 9 configured to connect to a tool attached to the actuator 1. As a result of the through passage, negative and/or positive pressure can be supplied to the tool 40 via the through passage 7. The tool or tool interface has a port for receiving negative and/or positive pressure from the rotary shaft 5. The port of the tool or tool interface can, in particular, be formed integrally with a connector of the tool and/or tool interface for connecting to the actuator 1, in particular the rotary shaft 5 of the actuator 1. Thus, it is possible to supply the tool rotated by the actuator 1 with positive and/or negative pressure through the connection to the actuator 1 instead of through external lines which can, for example, become snagged or tangled, especially when rotating. The rotary shaft 5 and the through passage 7 can be connected to a positive and/or negative pressure source via the first opening 8.

Figure 2B:
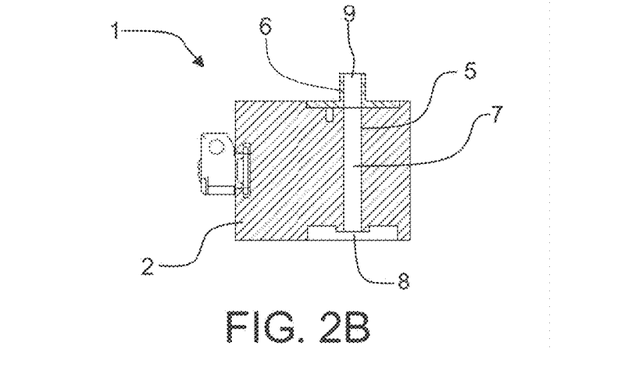
FIG. 2B is a side section view of the actuator of FIG. 1 along lines A-A of FIG. 2A.

FIG. 2B shows the actuator of FIG. 1 in a side section view along line A-A through the rotary shaft 5.

Figure 3A:
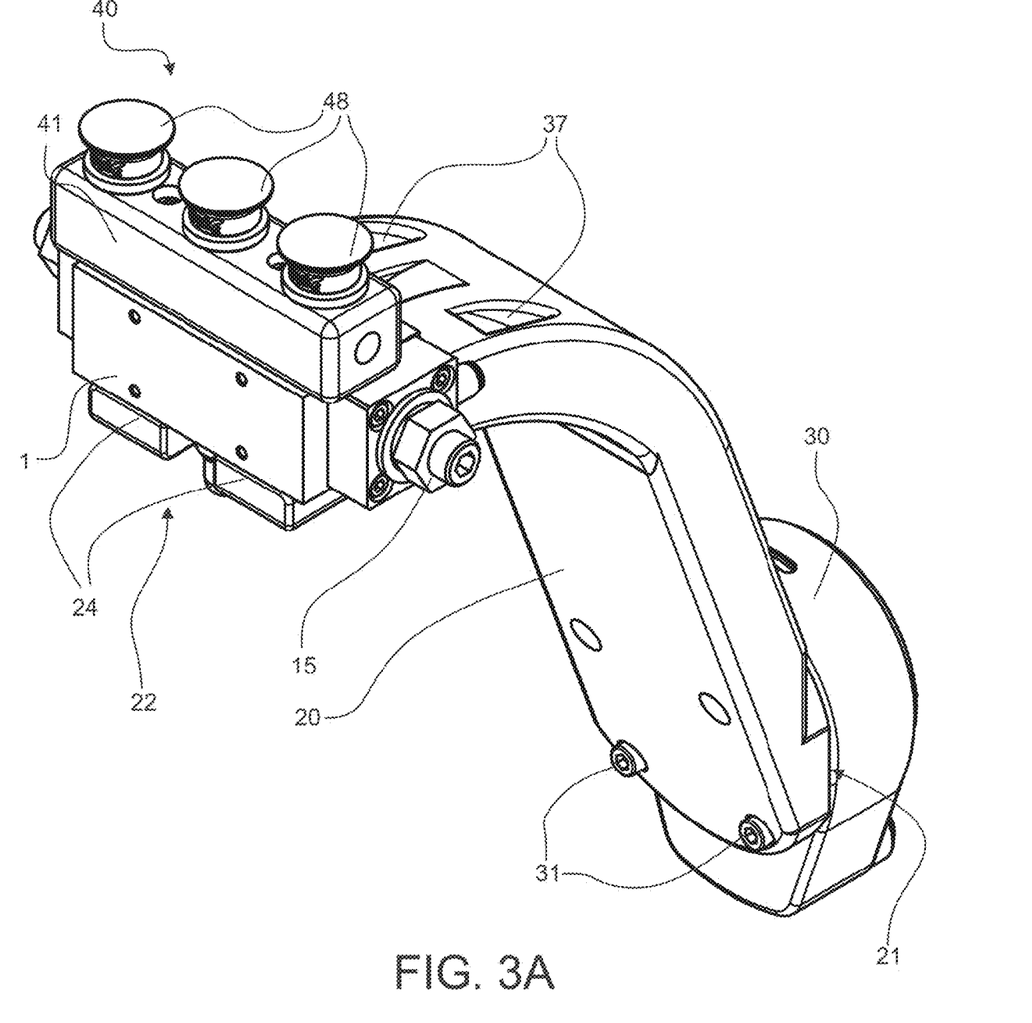
FIG. 3A shows an actuator attached to a gripper head and equipped with a suction cup tool.

FIG. 3A shows an actuator 1 attached to a gripper head 20. The gripper head 20 is connected to a gripper head mount 30. In the embodiment shown in FIG. 3A, the gripper head 20 is mounted on the gripper head mount 30 via fasteners 31. The gripper head mount 30 can further include a source of negative and/or positive pressure, for example, a vacuum generator or a compressor. The gripper head 20 has an internal channel 29 leading from a connection to the negative and/or positive pressure source in the gripper head mount 30 to a tool section 22 of the gripper head. The actuator 1 is mounted on the tool section 22. A tool 40 is mounted on the actuator 1 and the actuator 1 is configured to rotate the tool 40.

In the embodiment shown in FIG. 3A, the tool 40 is a suction cup tool. The suction cup tool includes a tool plate 41 and has suction cups 48 mounted therein. The suction cups 48 can be supplied with a vacuum via an internal tool plate channel 42. When the tool plate 41 is mounted on the actuator 1, the internal tool plate channel 42 connects to the through passage 7 of the rotary shaft 5 which, in turn, is connected to the internal channel 29 of the gripper head 20 and thus connected to the vacuum generator in the gripper head mount 30.

Figure 3B:
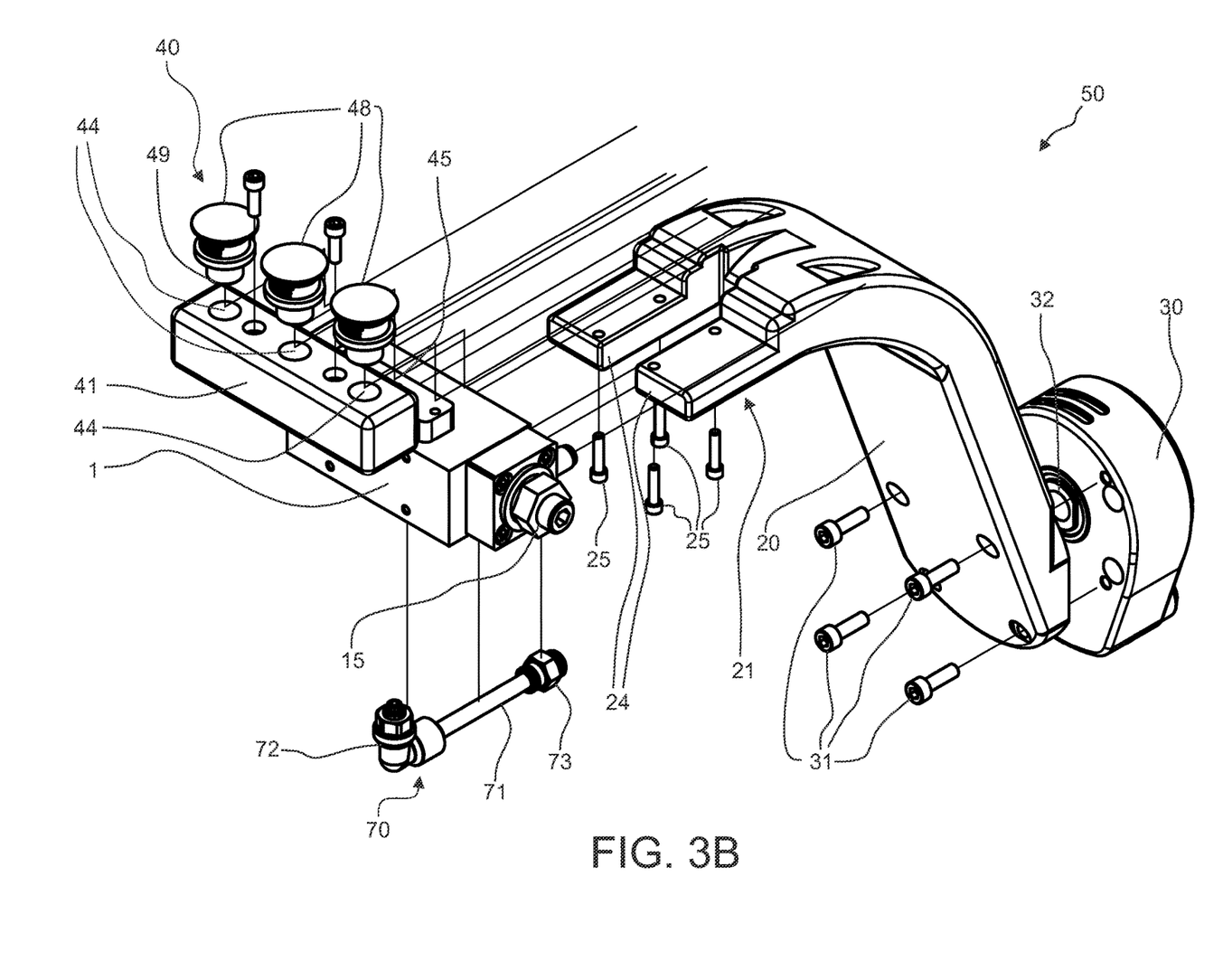
FIG. 3B shows the actuator and gripper head of FIG. 3A in an exploded view.

FIG. 3B shows the gripper head assembly 50 of FIG. 3A in an exploded view. An output of the positive and/or negative pressure source 32 in the gripper head mount 30 connects the internal channel 29 of the gripper head 20 when assembled. In the embodiment shown in FIG. 3B, the gripper head 20 includes a tool section 22 which defines a tool attachment region, here formed by two attachment projections 24. The actuator 1 is fixed to each attachment projection 24 via fasteners 25. The through passage 7 of the actuator 1 can be connected to the internal channel 29 of the gripper head 20 via a supply line 70. The through passage 7 of the actuator 1 can also be connected to the internal channel in other ways, such as via a direct connection from an outlet of the internal channel 29 in the tool section 22 to the through passage 7 in the rotary shaft 5 of the actuator 1. A rotary hub 45 is attached to the rotary shaft 5 and rotates therewith. The rotary hub 45 acts as a connector for the tool plate 41.

Figure 4A:
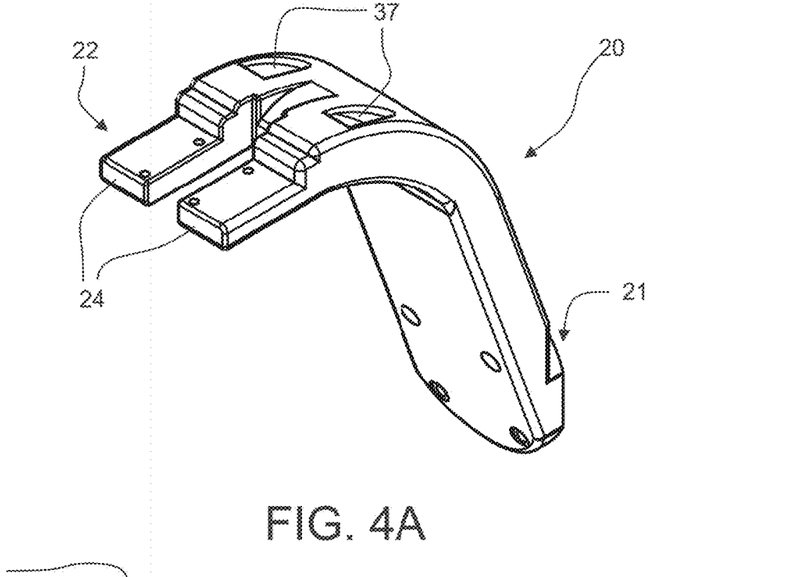
FIG. 4A shows a gripper head according to the disclosure.

An exemplary embodiment of the gripper head of FIG. 3B is shown in FIG. 4A. The gripper head 20 includes a mounting section 21 for attaching the gripper head 20 to a gripper head mount 30, such as a quick-change mount. The gripper head 20 can, for example, be attached to the gripper head mount 30 via threaded fasteners. The mounting section 21 defines a mounting plane. The gripper head 20 further has a tool section 22. In the embodiment shown in FIG. 4A, the tool section 22 includes two projections 24 for holding an actuator 1. The two projections conjointly define a gap therebetween.

Figure 4B:
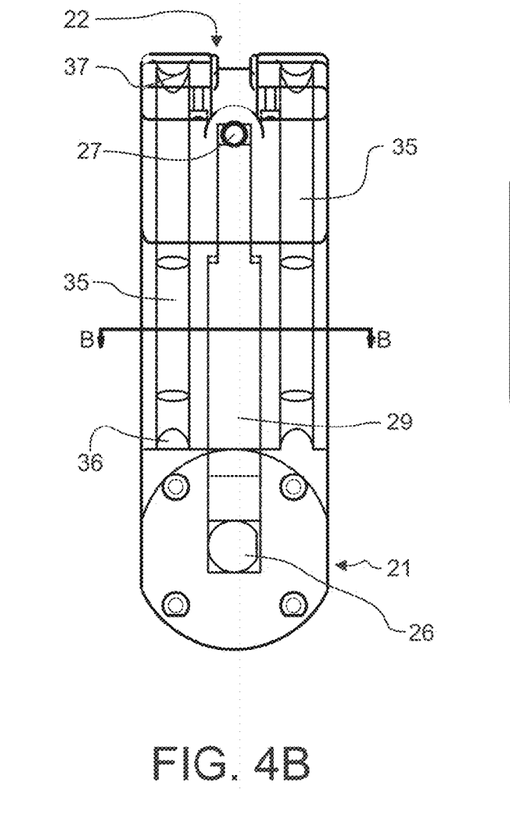
FIG. 4B shows a rear view of the gripper head of FIG. 4A with the internal channel shown.

FIG. 4B shows a rear, section view of the gripper head 20 of FIG. 4A. In the embodiment shown in FIG. 4B, the gripper head 20 defines openings through which fasteners can be inserted for fixing the gripper head 20 to a gripper head mount 30. A first port 26 is defined in the mounting section 21. An internal channel 29 extends from the first port 26 at the mounting section 21 to a second port 27 at the tool section 22, connecting the first port 26 to the second port 27. A negative and/or positive generator in the gripper head mount 30 can be operatively connected to the tool section 22 via the internal channel 29. The gripper head 20 can further include a pass-through passage 35 for, for example, a cable, tube or wire such as an air line or electrical line.

The gripper head 20 of FIG. 4B has two pass-through passages 35. The pass-through passages 35 have a first opening 36 at or near the mounting section 21 and a second opening 37 at or near the tool section 22. In the embodiment of FIG. 4B, a pass-through passage 35 is arranged on each side of the internal channel 29, which is centrally located in the gripper head 20.

According to an exemplary embodiment, the connector 14 of actuator 1 is connected to a pneumatic hose which is guided through the pass-through passage 35 which opens at a second opening 37 near the connector 14 when the actuator 1 is attached to the tool section 22 of the gripper head 20. The actuator 1 may also have two connectors 14 wherein each is connected to a pneumatic hose guided through a pass-through channel 35. In other embodiments, where the actuator 1 is electrically driven, the power and/or control cables can be guided through the pass-through channel(s) and connected to the connector(s) 14. The guidance through the pass-through channel 35 eliminates or at least reduces the potential of a hose and/or cable for the actuator becoming tangled or snagged.

Figure 4C:
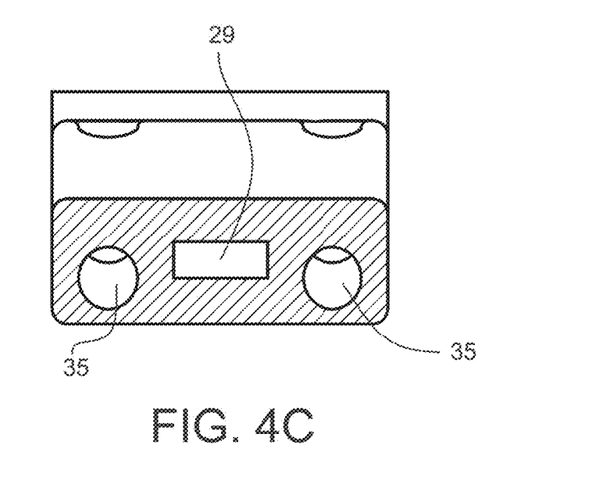
FIG. 4C shows a section view along line B-B of FIG. 4B.

FIG. 4C shows a cross-section of the gripper head body of FIG. 4B at line B-B. In the embodiment shown in FIG. 4C, the internal channel 29 has a rectangular cross-section and the pass-through passages 35 have a circular cross section.

As further shown in FIG. 3B, the internal channel 29 of the gripper head 20 can be connected to the first opening 8 of the through passage 7 of the rotary shaft 5 via a supply line 70. The supply line 70 includes a vacuum fitting 72, a vacuum tube 71, and a pneumatic fitting 73. The supply line 70 can also, for example, be a hose. The supply line 70 connects the second port 27 of the gripper head 20 to the first opening 8 of the through passage 7 of the rotary shaft 5. As a result, negative and/or positive pressure can be conveyed from a positive/negative pressure source, for example disposed in the gripper head mount 30, to the tool via the internal channel 29 of the gripper head and the through passage 7 of the rotary shaft 5. The aforementioned configuration eliminates the need for an external hose connection between the tool and a positive and/or negative pressure source which can move relative to each other causing the hose to become snagged or tangled when the tool moves relative to the gripper head. Additionally, the elimination of the hose also prevents the hose from becoming snagged on an external object, a processing station to which it is delivering a work piece, or on the work piece itself.

Figure 5:
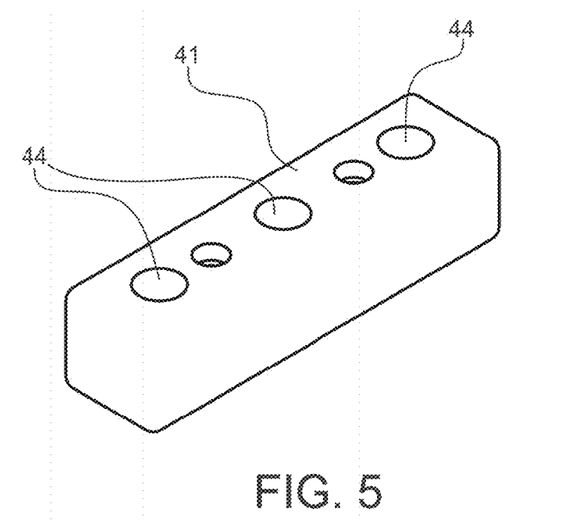
FIG. 5 shows a tool plate.

An embodiment of the tool plate 41 is shown in FIG. 5. The tool plate of FIG. 5 includes three receptacles 44 configured to receive and hold suction cups 48. In particular, the receptacles 44 can receive a stem 49 of a suction cup 48. The tool plate 41 can further define a hub pocket 43 into which the rotary hub 45 can be inserted for attaching the tool plate 41 to the actuator 1. In such embodiments, a rotary hub 45 or the like can act as a tool interface for the actuator 1. In the embodiment of FIG. 5, the tool plate 41 is fixed to the rotary hub 45 via fasteners inserted through fastening openings in the tool plate 41 and engaging the rotary hub 45. As a result, the tool plate 41 rotates with the rotary hub 45 which in turn is rotated by the rotary shaft 5 of the actuator 1. The implementation of a tool interface, for example in the form of a rotary hub 45, can facilitate a quick and efficient switching of tools attached to the actuator 1.

Figure 6A:
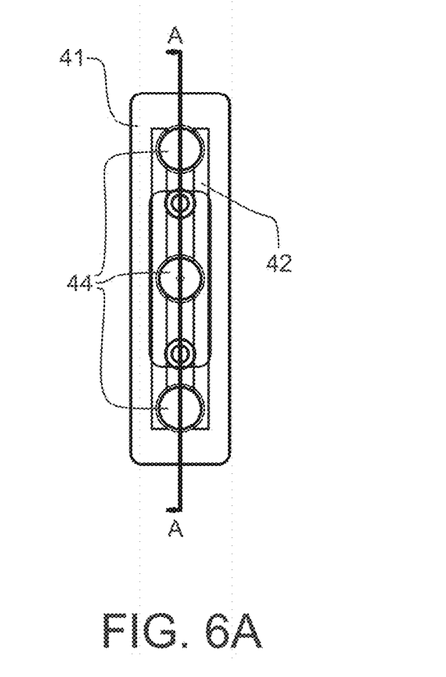
FIG. 6A is a top view of the tool plate of FIG. 5 showing an internal tool plate channel.

FIG. 6A shows the tool plate 41 of FIG. 5 in a top plan view. FIG. 6A shows tool plate channels 42 which connect the receptacles 44 to the positive and/or negative pressure source via the second opening 9 of the rotary shaft 5. In an embodiment, the tool plate defines two tool plate channels 42 running parallel. The extra tool plate channel 42 provides a redundancy in case the first tool plate channel 42 becomes blocked.

Figure 6B:
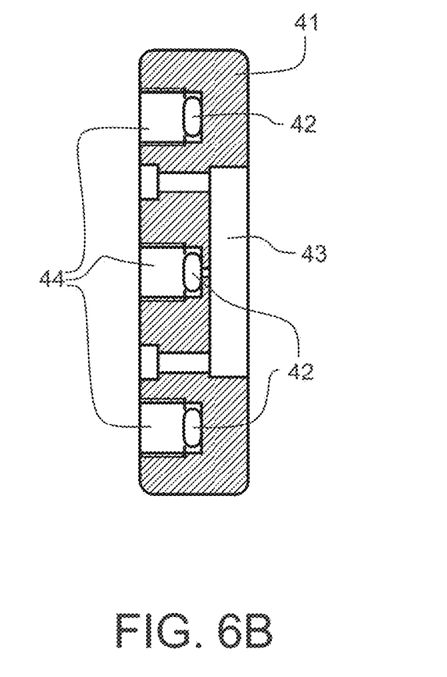
FIG. 6B is a section view of the tool plate of FIG. 6A along line A-A.

FIG. 6B is a section view of the tool plate 41 of FIG. 5. As shown in FIG. 6B, the tool plate 41 includes a tool plate channel 42 configured to supply each of the suction cups 48 mounted in the receptacles 44 with negative and/or positive pressure. The tool plate 41 has a port for receiving negative and/or positive pressure. In alternate configurations, the tool plate 41 may be equipped with tools other than suction cups 48 and may receive negative and/or positive pressure via the port. In further embodiments, the tool may, for example, be electrically driven and the port serves as an input for receiving power and/or commands.

Figure 7:
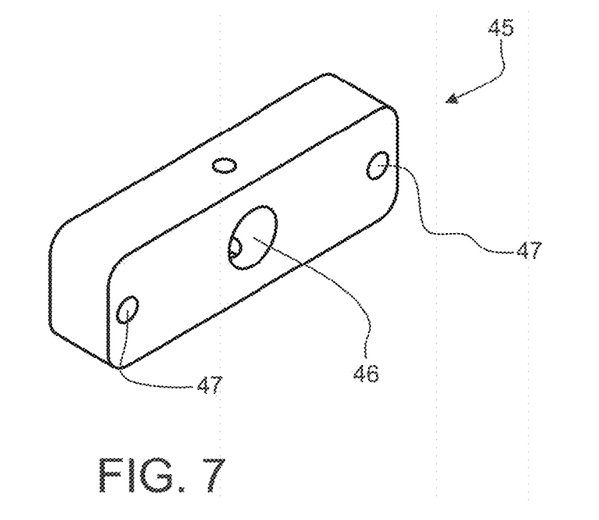
FIG. 7 shows an embodiment of a rotary hub for an actuator.

FIG. 7 shows a rotary hub 45. The rotary hub 45 is configured to be attached to the end of the rotary shaft 5 and to have the tool plate 41 attached thereto serving as an interface between the rotary shaft of the actuator 1 and the tool plate 41. Using a rotary hub 45 as an interface between the rotary shaft 5 and the tool plate 41 can enable a quicker retooling of a gripper head, that is, the tool plate 41 can be removed and replaced with a different tool plate equipped with different tools or differently scaled tools. The rotary hub of FIG. 7 includes a rotary hub passage 46. The rotary hub passage 46 accommodates the tool end 6 of the rotary shaft 5. When the rotary hub 45 is attached to the tool end 6 of the rotary shaft 5, the rotary hub 45 rotates with the rotary shaft 5. The rotary hub 45 further includes connectors 47 for connecting a tool plate 41. The connectors 47 can, for example, be bores with an inner thread for receiving a threaded fastener. The tool plate 41 can also be attached to the rotary hub 45 via a snap-on connection or other connection, especially for a quick and efficient retooling. The rotary hub passage 46 can facilitate a direct connection between the tool end 6 of the rotary shaft 5 and tool plate channel 42. The rotary hub passage 46 can also act as a connecting passage between the second opening 9 of the through passage 7 and the tool plate channel 42.

Figure 8:
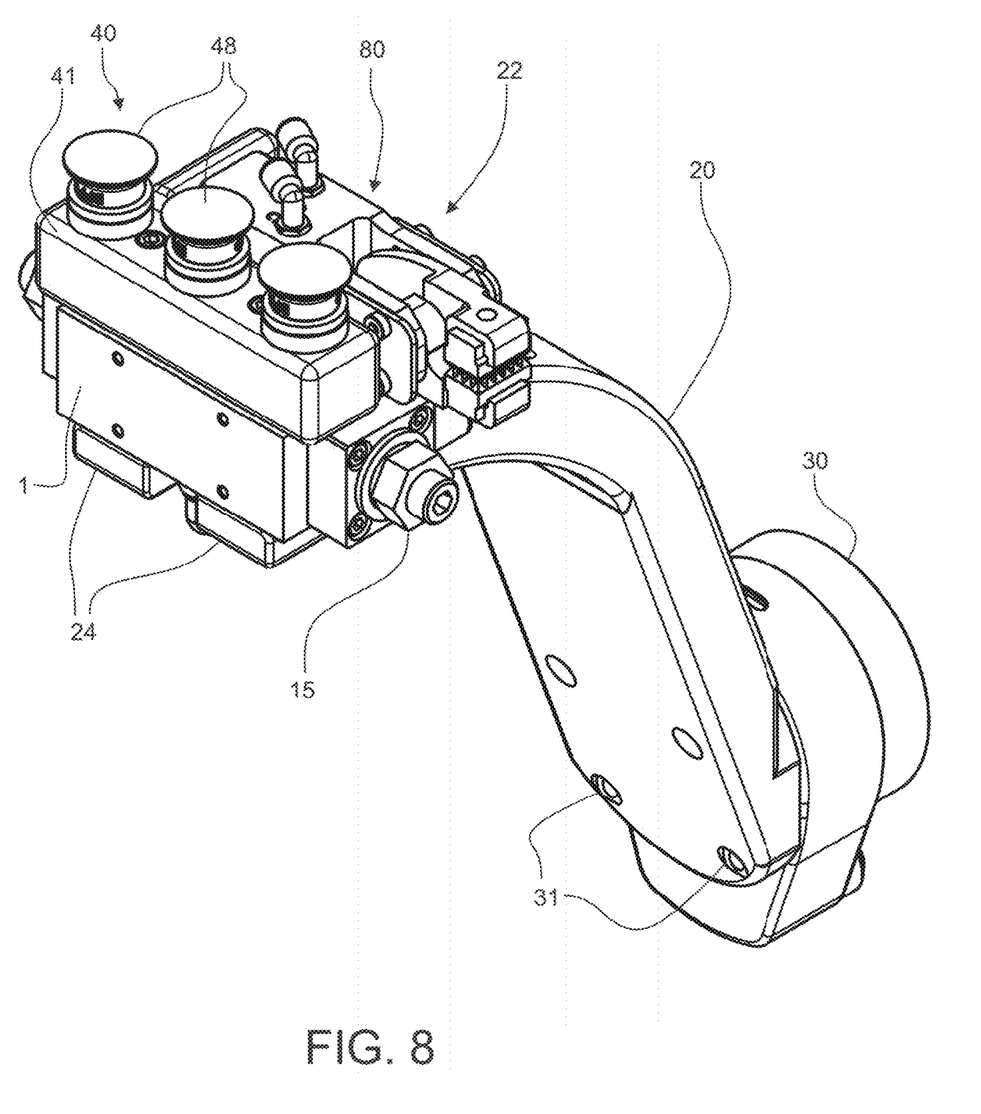
FIG. 8 shows a further embodiment of a gripper head assembly according to the disclosure equipped with a second tool.

FIG. 8 shows a further embodiment, wherein a gripper head 20 has an actuator 1 attached thereto. The gripper head 20 and actuator can be configured as described with respect to FIG. 3A. As in the embodiment shown in FIG. 3A, the actuator 1 shown is equipped with a tool plate 41 furnished with suction cups 48. The gripper head 20 further has a second tool 80 attached thereto. In the shown embodiment, the second tool 80 is a pinch gripper. The gripper head 20 can include the internal channel 29 so that the first tool 40 or tool plate 41 can be supplied with negative and/or positive pressure via the internal channel 29 of the gripper head 20 and the through passage 7 of the rotary shaft 5. The first and second tools can also be swapped.

Figure 9:
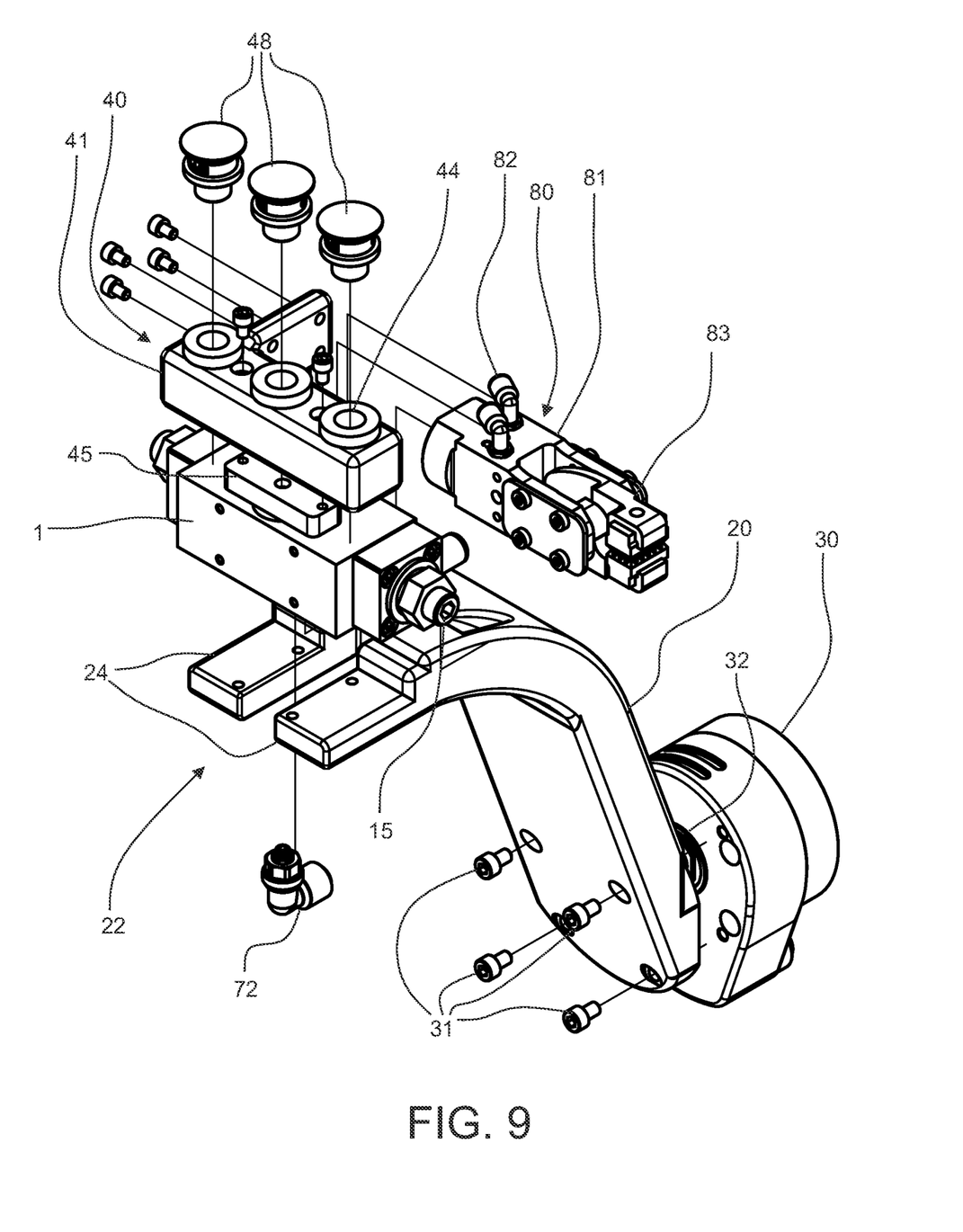
FIG. 9 is an exploded view of the gripper head assembly of FIG. 8.
Figure 10:
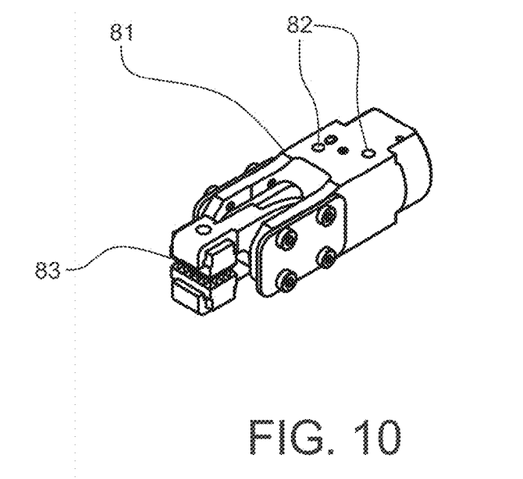
FIG. 10 is an exemplary embodiment of a pinch gripper.

FIG. 9 shows the embodiment of FIG. 8 in an exploded view. FIG. 10 shows an embodiment of a pinch gripper 81 having gripper jaws 83. The pinch gripper 81 further has a pinch gripper input 82. The pinch gripper input 82 can connect the pinch gripper 81 to a source of negative and/or positive pressure. Alternatively, the pinch gripper input 82 can be configured to receive an electrical signal and power for controlling and operating the pinch gripper 81.

Figure 11A:
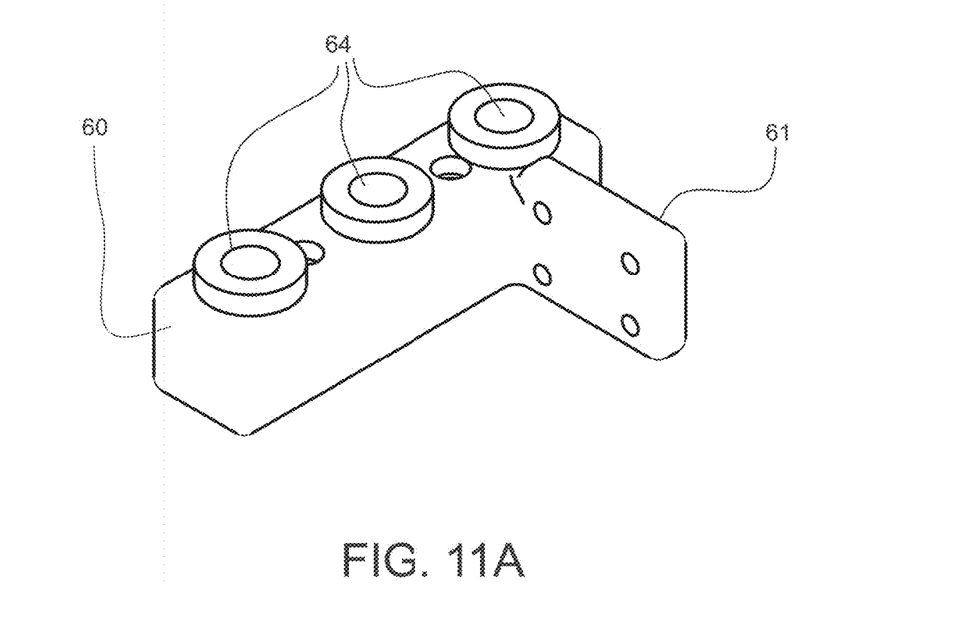
FIGS. 11A to 11D show a further embodiment of a tool plate.
Figure 11B:
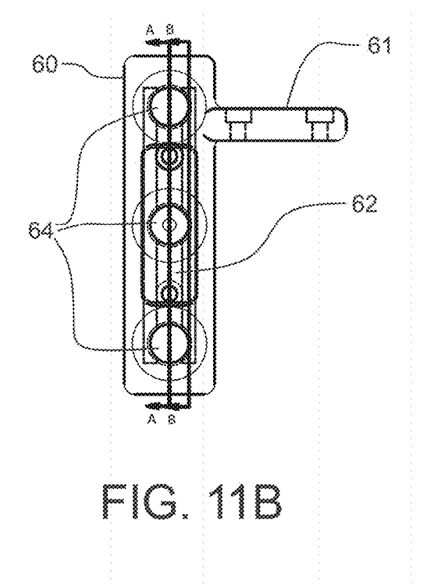
Figure 11C:
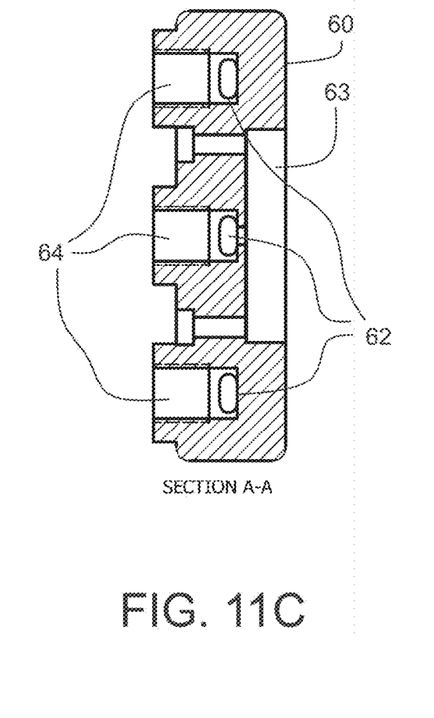
Figure 11D:
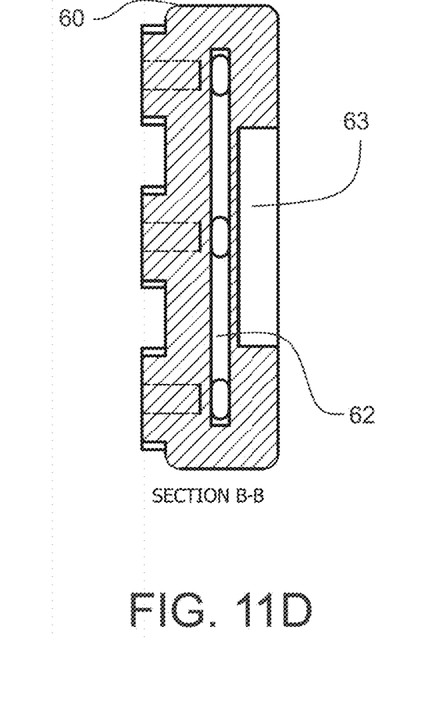

FIG. 11A shows an embodiment of a tool plate 60 which is configured to have two tools attached thereto. The main body of the tool plate 60 of FIG. 11A is configured similar to the tool plate 41 of FIG. 5. The tool plate 60 further includes a tool attachment section 61 for a second tool 80, here a pinch gripper 81. The tool attachment section 61 defines openings through which fasteners can be inserted so as to engage the pinch gripper 81 and hold the same on the tool plate 60. The second tool 80 can, however, also be attached to the tool plate 60 via any suitable attachment. In other embodiments, a second tool 80 other than a pinch gripper 81 can be attached to the tool attachment section 61 of the tool plate 60. FIG. 11B shows the tool plate 60 including the tool plate channel 62 connecting the receptacles 64 to the through passage 7 of the actuator 1. FIG. 11C shows a section view of the tool plate 60 along line A-A of FIG. 11B.

Figure 12:
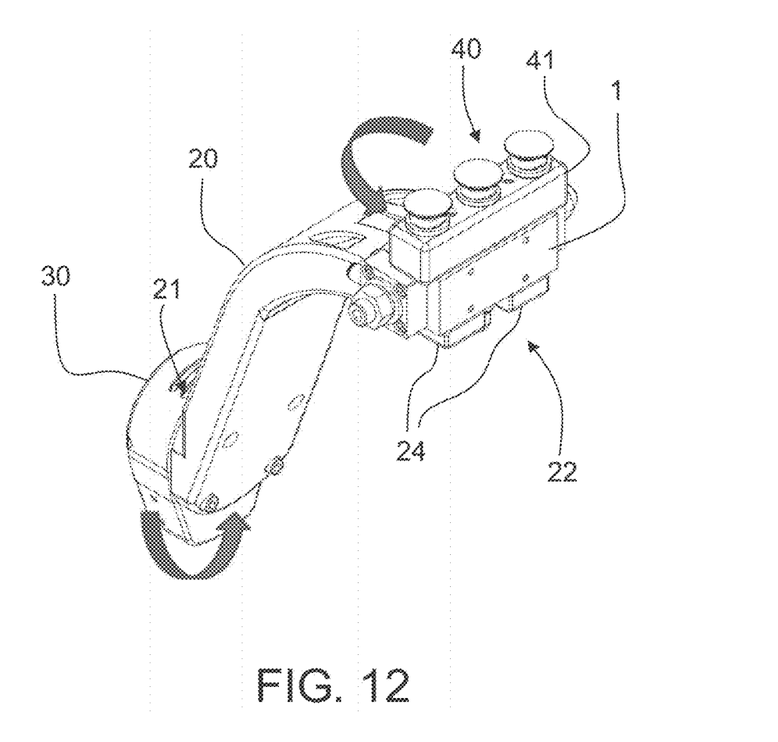
FIG. 12 is an illustration of an additional axis of rotation for a robotic arm enabled and provided by the actuator of the disclosure; and,
FIG. 13 is a comparative flowchart between a gripper head with and without an additional axis of rotation provided by an actuator according to the disclosure.

FIG. 12 shows an embodiment of a gripper head 20 having an actuator 1 attached to the tool section 22. FIG. 12 illustrates an additional axis provided by the actuator 1. For example, a first six axes can be provided by a robotic arm. An additional axis, in the described example, a seventh axis, is provided by the actuator 1 mounted on the gripper head 20. Further, as a result of the combination of the internal channel 29 in the gripper head 20 and the through passage in the rotary shaft, no air hoses need to be connected to the tool plate in order to provide the same with negative and/or positive pressure. The omission of such air hoses reduces or eliminates the chances of the gripper head 20 becoming tangled or caught on an object. This also enables the gripper head 20 to be used and perform movements in environments with limited space. The efficiency of the robotic arm and the processes carried out by the arm can also be improved in that the tool 40 can be repositioned quickly without requiring additional movements of the robotic arm or wrist.

Figure 13:
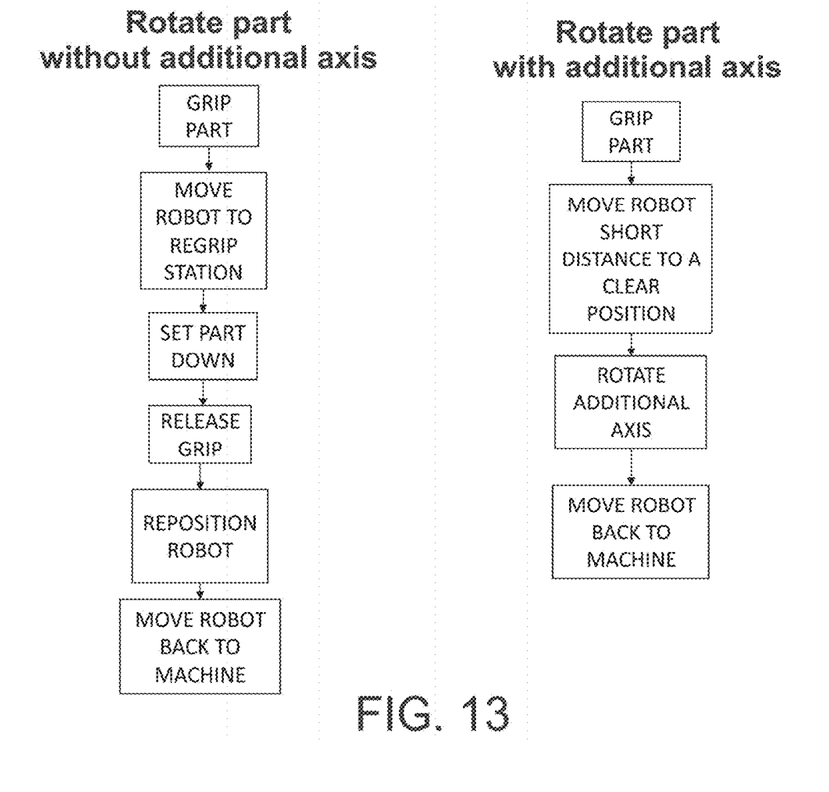

FIG. 13 shows a comparison of a routine, which can be performed by the gripper head 20 of FIG. 12, to a corresponding routine by a conventional gripper head. With a conventional gripper head system, the gripper head initially grips the workpiece, for example, from a storage location or from a processing station processing the workpiece, and then moves the workpiece to a regrip station. At the regrip station, the workpiece is set down and released in a certain position. The gripper head is then repositioned via the robot to regrip the workpiece so that it can then be brought back to the processing station or another processing station gripped in such a manner so as to be properly provided for processing or further processing by the processing station. However, with the additional axis provided by the actuator according to the disclosure, it is possible to grip the workpiece and have the robot make a short movement to an area where the workpiece can be rotated via the actuator. As a result, the workpiece can be retrieved and repositioned for processing without needing to set the workpiece down for regripping in the repositioned manner.

It is understood that the foregoing description is that of the preferred embodiments of the invention and that various changes and modifications may be made thereto without departing from the spirit and scope of the invention.

LIST OF REFERENCE NUMERALS

1 Actuator
2 Actuator body
5 Rotary shaft
6 Tool end of rotary shaft
7 Through passage
8 First opening
9 Second opening
10 Drive
12 Casing
14 Connector
15 Angle adjuster
20 Gripper head
21 Mounting section
22 Tool section
24 Attachment projections
25 Fasteners
26 First port
27 Second port
28 Connecting tube
29 Internal channel
30 Gripper head mount
31 Fasteners
32 Positive/negative pressure source opening/output
35 Pass-through passage
36 First opening of pass-through passage
37 Second opening of pass-through passage
40 Tool
41 Tool plate
42 Tool plate channel
43 Hub pocket
44 Receptacles
45 Rotary hub/Tool interface
46 Rotary hub passage
47 Rotary hub connectors
48 Suction cup
49 Suction cup stem
50 Gripper head assembly
60 Tool plate
61 Tool attachment section
62 Tool plate channel
63 Hub pocket
64 Receptacles
70 Supply line
71 Vacuum tube
72 Vacuum fitting
73 Pneumatic fitting
80 Second tool
81 Pinch gripper
82 Pinch gripper input
83 Pinch gripper jaws

What is claimed is:

1. A rotary actuator for a gripper head, the rotary actuator comprising:
   an actuator body having an attachment region configured to attach said actuator body to the gripper head;
   a rotary shaft having a mounting section for a tool;
   a rotary drive having a connector configured to receive an input;
   said rotary drive being configured to rotate said rotary shaft upon receiving the input;
   said rotary shaft defining a through passage;
   said through passage having a first port for receiving at least one of negative pressure and positive pressure;
   said through passage having an outlet at said mounting section configured to supply the tool with the at least one of negative and positive pressure;
   a tool plate configured to attach to said rotary shaft and rotate therewith; and,
   said tool plate defining an internal channel configured to connect said outlet of said through passage to an input of a tool.

2. The rotary actuator of claim 1 further comprising:
   a rotary hub configured to be mounted between said mounting section of said rotary shaft and said tool plate.

3. The rotary actuator of claim 2, wherein said tool plate defines a hub pocket; and, said rotary hub is at least partially accommodated in said hub pocket when said tool plate is attached to said rotary hub.

4. The rotary actuator of claim 2, wherein said connector of said rotary drive is a first connector; said rotary drive has a second connector configured to receive at least one of positive pressure and negative pressure; and, said rotary actuator rotates said rotary hub in a first direction in response to receiving the at least one of negative pressure and positive pressure at said first connector and in a second direction in response to receiving the at least one of positive and negative pressure at said second connector.

5. The rotary actuator of claim 1 further comprising:
   a vacuum tool plate;
   said tool being a suction cup; and,
   said vacuum tool plate having a connection point configured to hold said suction cup.

6. The rotary actuator of claim 5, wherein said vacuum tool plate defines an internal channel configured to connect said outlet of said through passage to said connection point.

7. The rotary actuator of claim 1, wherein said rotary drive is pneumatically driven.

8. The rotary actuator of claim 1, wherein said rotary drive is electrically driven.

9. The rotary actuator of claim 2, wherein said rotary hub is configured to hold said tool plate and a second tool.

10. A gripper head having a rotary tool attachment, the gripper head comprising:
    an actuator having an attachment region for a tool configured to attach said actuator to the gripper head;
    said actuator having a rotary shaft with a mounting section for the tool;
    said actuator further having a rotary drive;
    said rotary drive having a connector configured to receive an input and being configured to rotate said rotary shaft upon receiving the input;
    said rotary shaft defining a through passage;
    said through passage having a first connection for receiving at least one of negative pressure and positive pressure;

said through passage having an outlet at said mounting section configured to supply the tool with the at least one of negative and positive pressure;

a gripper head body having a mounting area and a tool section defining an attachment area for a tool assembly;

said mounting area being configured to attach said gripper head body to a mount of a robot;

said gripper head body having a first port at said mounting area and a second port at said tool section;

said gripper head body defining an internal channel mutually connecting said first port and said second port;

said internal channel being configured to pass air between said first port at said mounting section and said second port at said tool section; and, said first connection of said rotary shaft being configured to connect to said second port of said gripper head for supplying the tool with the at least one of negative and positive pressure.

11. The gripper head of claim 10 further comprising a connector connecting said second port of said gripper head to said first connection of said through passage.

12. A rotary actuator assembly comprising:
an actuator body having an attachment region configured to attach said actuator body to a gripper head;
a rotary shaft having a mounting section;
a rotary drive having a connector configured to receive an input;
said rotary drive being configured to rotate said rotary shaft upon receiving the input;
said rotary shaft defining a through passage;
said rotary shaft having a first port for receiving at least one of negative pressure and positive pressure;
a rotary hub configured to hold a first tool and a second tool; and,
said through passage having an outlet at said mounting section configured to supply at least one of the first tool and the second tool with the at least one of negative and positive pressure.

13. The rotary actuator assembly of claim 12, wherein said first tool is a vacuum tool plate including suction cups and said second tool is a pinch gripper.

14. The rotary actuator assembly of claim 13, wherein said vacuum tool plate is configured to attach to said rotary hub; and, said vacuum tool plate includes a secondary tool attachment section for holding said pinch gripper.

15. An actuator assembly comprising the rotary actuator of claim 1 and a translational actuator.

16. The actuator assembly of claim 15, wherein the actuator assembly includes a plurality of rotary actuators each defining a rotational axis and a plurality of translational actuators each defining a plane of translation; and, each of said rotary actuators and said translational actuators is controlled by independent input pressures.

17. The actuator assembly of claim 16, wherein each of said translational actuators and said rotary actuators can be actuated concurrently.

18. The rotary actuator of claim 1, wherein said rotary shaft defines an axis of rotation; and, said rotary drive is configured to rotate said rotary shaft so as to assume any rotational position along said axis of rotation.

19. An actuator for a gripper head, the actuator comprising:
an actuator body having an attachment region configured to attach said actuator body to the gripper head;
a drive element having a mounting section for a tool;
a drive having a connector configured to receive an input;
said drive being configured to move said drive element upon receiving the input;
said drive element defining a through passage;
said through passage having a first port for receiving at least one of negative pressure and positive pressure;
said through passage having an outlet at said mounting section configured to supply the tool with the at least one of negative and positive pressure;
a tool plate configured to attach to said drive element and move therewith; and,
said tool plate defining an internal channel configured to connect said outlet of said through passage to an input of a tool.

20. The actuator of claim 19, wherein the actuator is a translational actuator.

21. The rotary actuator of claim 1, wherein said internal channel is directly connected to said outlet of said through passage.

* * * * *